July 21, 1936.   F. W. ADAMS   2,048,045
PROCESS AND APPARATUS FOR FORMING TAPERED FIBROUS UNITS
Filed Aug. 23, 1933   2 Sheets-Sheet 1
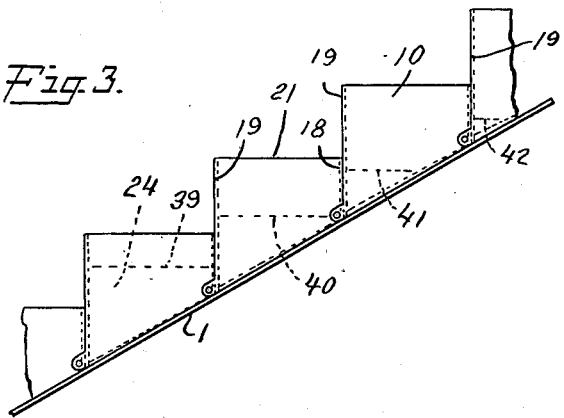
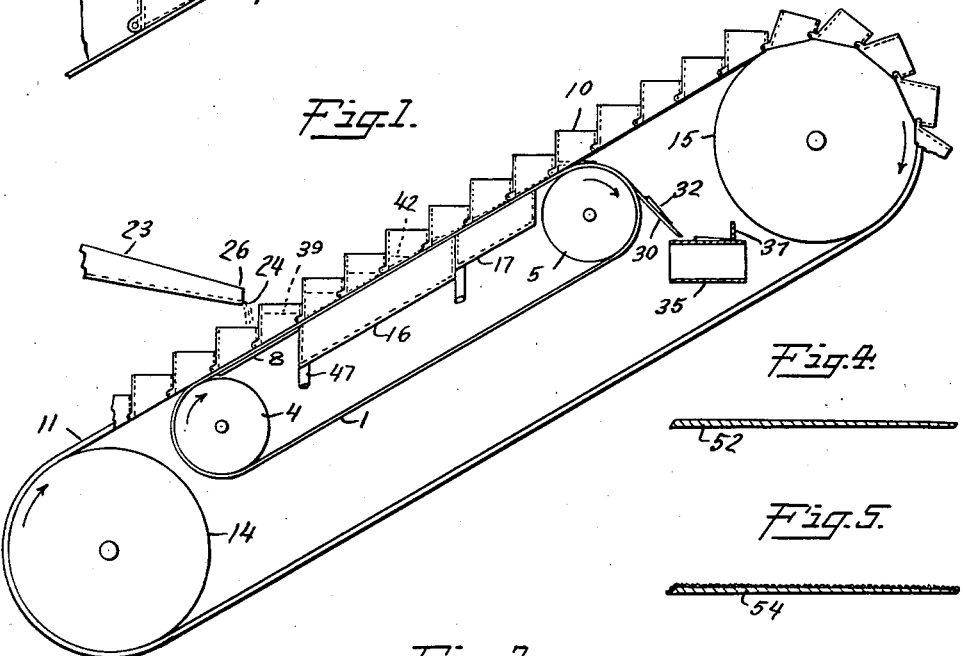
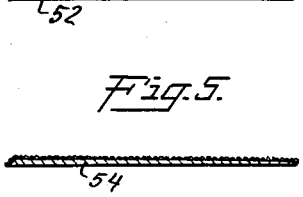
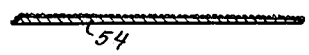
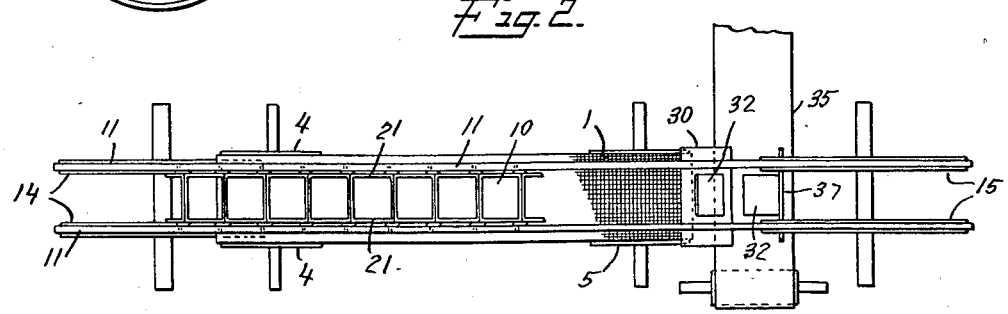
INVENTOR
Floyd W. Adams
BY
ATTORNEY July 21, 1936.                F. W. ADAMS                    2,048,045
            PROCESS AND APPARATUS FOR FORMING TAPERED FIBROUS UNITS
                     Filed Aug. 23, 1933          2 Sheets-Sheet 2
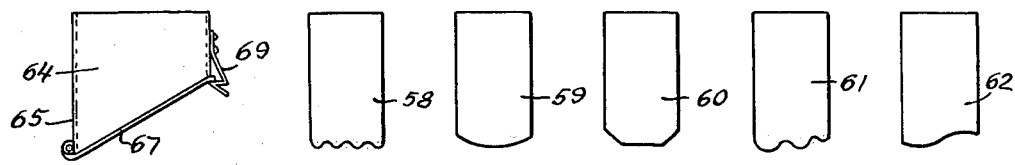
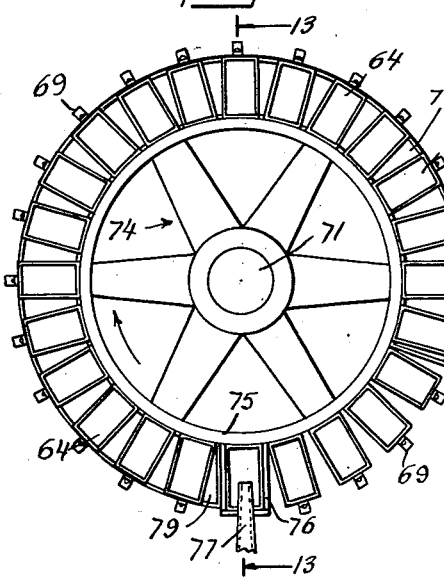
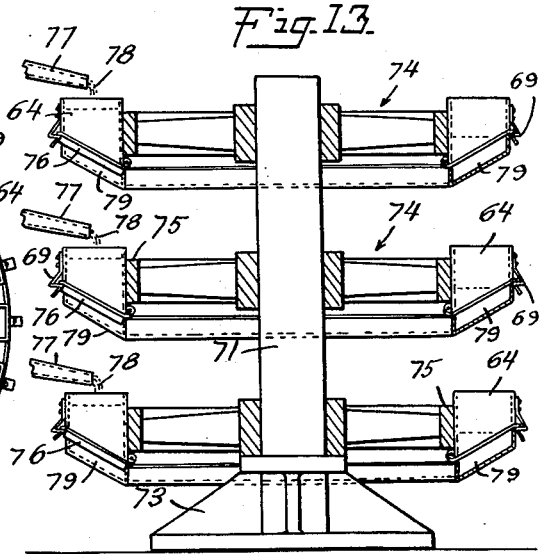
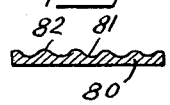
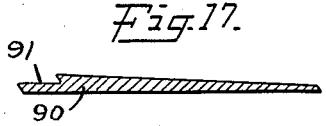
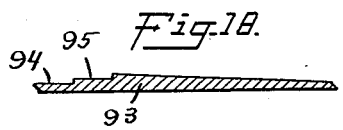
INVENTOR
Floyd W. Adams
BY
ATTORNEY Patented July 21, 1936

2,048,045

UNITED STATES PATENT OFFICE 2,048,045

PROCESS AND APPARATUS FOR FORMING TAPERED FIBROUS UNITS

Floyd W. Adams, Madison, Maine, assignor to The Barrett Company, New York, N. Y., a corporation of New Jersey Application August 23, 1933, Serial No. 686,366

21 Claims. (Cl. 92—54)

This invention relates to the production of tapered fibrous elements and more particularly to the production of tapered fibrous units or strips for use in the manufacture of tapered roofing and siding elements.

One object of the invention is to provide an improved procedure and apparatus for forming tapered units or elements from a liquid suspension of fibrous stock.

Another object of the invention is to provide a novel method and apparatus for manufacturing tapered fibrous elements and for controlling the angle of taper.

Other objects and advantages will appear from the following detailed description of this invention.

In manufacturing tapered shingles, tapered shingle strips, or other protective coverings of varying thickness prior to this invention, it was common practice to employ a felt base of uniform thickness and to secure the taper by varying the thickness of the bituminous coating applied to its surface. This was accomplished by saturating the felt base with liquid bitumen, applying a thick coating of bituminous material, such as asphalt, to the saturated base, and then molding the coating by means of rollers of the desired contour so that the resultant roof covering was given the desired shape.

Another previous method involved folding bitumen-impregnated felt or paper into the desired tapered shape leaving the thick end open, inserting a filler of comminuted inert material mixed with a suitable binder through the open end, and then folding and closing the open end to form the desired unit. It has also been proposed to mix comminuted fibrous material with a bitumen binder and to press or mold the resultant mass into shingles of the desired shape. All of these methods are costly and involve the use of unnecessarily large amounts of bituminous material.

To overcome the disadvantages outlined above, it has been proposed to manufacture tapered shingles by employing a felt base which is itself tapered. This tapered base may be saturated, coated with bitumen, and surfaced with mineral granules in the manner usually employed in making shingles of uniform thickness, to produce tapered shingles. The methods heretofore proposed for fabricating this tapered base in general involved forming several felt webs, each of uniform thickness and varying width, and combining these webs to form a product of tapering thickness.

The present invention is in the nature of an improvement over such methods. In this invention a tapered felt unit is made in a single operation by supplying a liquid suspension of suitable fibrous stock to a paper-making wire or wire screen maintained in a plane inclined with respect to the horizontal. The fibrous stock is deposited on the screen in a layer of varying thickness to form a substantial homogeneous tapered unit or element. The angle of taper of the element is dependent upon the angle of inclination of the wire screen and varies with changes in inclination of the screen, i. e., the greater the angle of inclination of the screen, the greater will be the taper of the resultant unit.

For a better understanding of the invention, reference should be made to the accompanying drawings wherein is shown by way of illustration a preferred embodiment of the invention and in which, Fig. 1 is a side elevation showing a preferred arrangement of the apparatus, parts being broken away for the sake of clarity;

Fig. 2 is a plan view of the apparatus of Fig. 1;

Fig. 3 is a fragmentary side elevation showing various stages of the formation of the fibrous units on the foraminous support;

Fig. 4 is a section through a finished tapered unit;

Fig. 5 is a section through a finished shingle made from the unit of Fig. 4;

Figs. 6 to 10 inclusive are plan views of finished tapered units showing various shapes in which they can be made;

Fig. 11 is a side elevation of a modified stock box which may be used to form tapered units;

Fig. 12 is a plan view of apparatus for supporting the stock boxes of Fig. 11;

Fig. 13 is a sectional elevation taken along the line 13—13 of Fig. 12;

Figs. 14 to 16 inclusive are transverse sections through units formed on modified screens;

Figs. 17 and 18 are longitudinal sections through units formed on other types of modified screens.

Referring to Figs. 1 and 2, numeral 1 denotes an endless foraminous carrier or belt, which may be an ordinary paper-making wire or wire screen well known in the art. The screen passes around spaced horizontal rollers 4 and 5, driven at a suitable speed through any suitable drive (not shown). Rollers 4 and 5 are spaced from each other, both horizontally and vertically so that the screen in passing from one roller to the other will travel in a direction inclined with respect to the horizontal. The rollers are mounted in suitable supports so that they may be moved relatively to each other and their position fixed so that any desired angle of inclination of the screen passing therearound may be obtained. In the set-up shown in the drawings, the rollers and screen are adapted to move in a clockwise direction.

Disposed between the rollers is an impervious plate 8 of any suitable material, such as copper, sheet steel, wood etc. This plate is positioned so that the screen in travelling upwardly from roller 4 to roller 5, will pass over and contact with its upper surface. This plate may be adjusted to conform its position and inclination with the inclination of the wire screen.

A series of stock boxes or containers 10 contact with the screen and travel along therewith during the upward passage of the screen from roller 4 to roller 5. These boxes are carried by endless chains 11 running over sprockets 14 and 15 which are driven at such a rate that the boxes will have substantially the same linear movement as the screen. Sprockets 14 and 15 are preferably adjustably mounted so that the inclination of the boxes passing therearound may be made to conform with the inclination of the wire screen with which the boxes contact. During the passage from roller 4 to roller 5, the screen and stock boxes pass first over the plate 8, then over a drain pan 16, and thereafter over suction boxes 17. When the screen and stock boxes reach roller 5, they break contact with each other, the boxes travelling upwardly to sprocket 15 and the screen passing around roller 5. Each box 10 is open both at the top and at the bottom. Forward wall 18 and rear wall 19 of the boxes are both substantially rectangular in shape, the height of the forward wall being usually considerably less than that of the rear wall. When the side walls 21 and the front and rear walls 18 and 19 are assembled to form the completed box, the top edges of the walls lie in a horizontal plane, and the bottom edges lie in an inclined plane. The inclination of this plane is preferably equal to the inclination of the wire screen with which the bottom edges of the walls are contacted so that an effective contact surface is obtained. The stock boxes may be constructed of any desired size. They may be made with a cross-sectional area approximating that of a finished shingle or shingle strip, or they may be of sufficient size so that several shingles may be cut from the same unit.

A feed trough 23 is provided for feeding a liquid suspension of fibrous stock 24 into the stock boxes. Stock 24 may be composed of a mixture of rag and paper fibers, or of asbestos fibers, or other suitable fibrous material. Discharge end 26 of the feed trough is situated directly over plate 8, so that the stock will be introduced into the boxes during their passage over the plate.

Numeral 30 denotes an inclined conveyor or plate for couching the finished moist fibrous units or elements 32 from the screen and delivering them to a suitable belt 35 which transfers them to a drier. A baffle 37 may be provided to aid in positioning the elements on the belt.

In operation a liquid suspension of fibrous stock, preferably an aqueous suspension of rag and paper fiber, is fed from trough 23 into the stock boxes 10 as they pass over plate 8. The liquid stock may be discharged from the trough and fed into the boxes either continuously or intermittently, but in any event the flow should be regulated in accordance with the rate of travel of the boxes so that each box will receive the desired amount of stock indicated by level 39 in Figs. 1 and 3. Plate 8, with which the screen and bottom edges of the boxes contact, forms a closure or bottom for the boxes during their travel thereover, and prevents escape of stock from the boxes during the filling period. As the boxes and screen continue to travel upwardly and pass beyond plate 8, the water or other liquid in the suspension will filter through the interstices in the screen and deposit the fibrous material thereon. Numerals 40, 41, and 42 indicate the level of the stock remaining in the boxes at various stages in the operation.

Due to the inclination of the screen and boxes, the depth of liquid stock fed into the boxes will be considerably less at the forward or upper portion of each box than at the rear or lower portion. Consequently, as the liquid filters or passes through the screen and deposits the fibrous material thereon, a greater amount of material will deposit on the screen adjacent the lower side of the box than the upper side. This results in the formation of tapered elements or units as shown in Fig. 3. The greater the angle of inclination of the screen and boxes, the greater will be the variation in depth of liquid stock in the boxes and the greater will be the taper of the resultant fibrous elements. By merely changing the angle of inclination along which the screen and stock boxes travel, it is possible to change and regulate the taper of the fibrous elements which are formed.

The water which filters through the screen falls in the drain pan 16 over which the screen and boxes pass and is led off through a suitable conduit or drain 47. The suction boxes 17, which are provided preferably near roller 5, aid in drawing water from the stock to produce firm and fairly dry elements. By using suction, the filtering time and consequently the necessary distance of contact between the screen and stock boxes can be made considerably shorter than if no suction were employed.

As the screen begins to pass over roller 5, the contact with the walls of the stock boxes is broken. The fibrous units remain on the screen and are couched therefrom by the inclined conveyor 30 as the screen begins its downward path over the roll. The units, which at this point contain some moisture, are removed by any suitable means, such as conveyor belt 35, and are passed through a suitable drying apparatus (not shown) to form the finished units 52 shown in Fig. 4. Subsequently the units may be saturated with liquid bitumen, such as asphalt or coal tar pitch, coated with bituminous material such as asphalt, and surfaced with mineral grit, such as broken stone, slate or mica in a manner well known in the roofing art, to form the finished shingles 54 shown in Fig. 5. If the units formed on the screen are to be cut into smaller sizes, this may be done after the drying step and before the saturation and coating or after the element has been saturated, coated and surfaced.

It will be noted that the apparatus of this invention is simple in design and relatively easy to operate. The finished tapered units are of uniform texture and substantially homogeneous throughout. Moreover, this invention provides a novel and highly efficient means and method for manufacturing units of any desired taper.

In plan the stock boxes may be constructed other than rectangular in shape, as described above, to give units having various types of leading edges. Figs. 6, 7, and 8 are plan views of units 58, 59, and 60 having symmetrical leading edges while Figs. 9 and 10 depict units 61 and 62 having irregular leading edges.

Although I have shown and described a process in which the stock is fed to a screen passing upwardly in an inclined direction, it should be understood that the units could be formed on a screen travelling in a downwardly inclined direction. This could be done with the apparatus shown in the drawings merely by moving the screen and boxes in a counterclockwise direction, setting the plate 8 and trough 23 adjacent roller 5, and removing the finished units prior to passing the screen over roller 4.

Fig. 11 shows a modified type of stock box, indicated by the numeral 64, which may be used for forming tapered units. An open-bottom box 65, which may be similar in size and shape to the stock boxes described above, is provided at the bottom with a hinged screen 67 which may be clamped or otherwise securely held against the box by means of a fastening device 69. After clamping the screen in place, liquid stock may be introduced into the box in any desired manner and the liquid allowed to drain through the screen forming the fibrous unit thereon. The screen may then be unclamped and dropped back on the hinge thereby allowing the finished unit to be removed from the screen.

A plurality of such stock boxes 64 may be arranged on a rotatable support or carrier to form an apparatus such as shown in Figs. 12 and 13. Numeral 71 denotes a vertical shaft rotatably mounted in a base or bearing 73. Fixed horizontally around the shaft are circular supporting members 74 to the rim 75 of which are attached a plurality of the stock boxes 64. As the shaft 71 is rotated the stock boxes will revolve therearound in a horizontal plane. Rotation of the shaft 71 is preferably made intermittent and is arranged so that each angular movement will be equal to the angular distance between adjacent boxes 64, i. e., if there are twenty-four boxes equally spaced around the rim 75, the shaft will rotate fifteen degrees during each movement.

A stationary impervious plate 76 is positioned below the stock boxes 64 so that, during the travel of the stock boxes, the screens 67 will intermittently contact with and pass over its upper surface. A feed trough 77 is provided for intermittently feeding a liquid suspension of fibrous stock 78 into the stock boxes. This feed trough is situated directly over plate 76 so that the fibrous stock will be introduced into the boxes during the time they are positioned over the plate. The plate thus acts as a closure or bottom for the boxes and prevents escape of liquid therefrom during the filling period.

The boxes next pass over a suitable drain trough or drain pan 79. Water which filters through the screens 67 falls into this trough and is led off through a suitable conduit (not shown). If desired, suction boxes may be provided to aid in drawing the water through the screens. After the boxes pass over the drain pan, the screens 67 are swung back on their hinges and the fibrous units removed.

The movement of the boxes should be governed so that during a single revolution around the shaft there will be sufficient time for a box to be filled with liquid stock, the liquid to drain through the screen, and the finished tapered unit to be removed from the box. Although three supporting members 74 and three series of boxes are shown in the drawings, it is evident that any number may be used to meet the operating requirements.

Instead of using screens having a flat uniform surface, the screens may be shaped to give various surface configurations on the finished units.

Fig. 14 is a transverse section through a tapered unit 80 the top surface of which has a regular wavy appearance. Such a unit may be made by employing a screen having a series of relatively deep corrugations. Troughs 81 and crests 82 of the unit are formed by the ridges and the valleys respectively of the corrugated screen. Fig. 15 shows a shingle 84 formed on a screen having a series of shallow and more or less irregular depressed and raised areas. Fig. 16 is a transverse section through a tapered element 87, the top of which is provided with flat and relatively wide ribs 88 and adjacent depressions 89.

Fig. 17 is a longitudinally section through a tapered fibrous unit 90 provided with a depressed area 91 extending transversely across the thicker end thereof. Such a unit can be formed by using an inclined screen having a raised offset area at its lower end.

Fig. 18 is a longitudinal section through a tapered element 93 having two depressed areas 94 and 95 at its thicker end. Numerous other pleasing surface effects can be obtained by employing the proper types of screens.

Since certain other changes in carrying out the process and in the constructions set forth may be made without departing from the scope of this invention, it is intended that all matter contained in the above description or shown in the accompanying drawings shall be interpreted as illustrative and not in a limiting sense.

I claim:

1. The process of fabricating fibrous units of tapering thickness on a wire mesh having open-bottom containers resting thereon and arranged to pass over an inclined plate which prevents flow from the container of liquid suspension introduced thereinto, which comprises contacting the wire mesh and containers with the inclined plate, partly filling the containers with a liquid suspension of fibrous stock, and removing the wire mesh and containers from contact with the plate.

2. The process of forming tapered fibrous shingle elements on an inclined foraminous belt, which comprises superimposing receptacles containing fibrous stock in liquid suspension on the inclined foraminous belt and allowing the liquid to pass from the receptacles through the belt.

3. The process of fabricating tapered felt roofing units on a foraminous carrier having an open-bottom box in contact therewith and an inclined plate therebeneath, which comprises passing the box and carrier over the inclined plate, introducing a liquid suspension of fibrous material into the box during its passage over the plate, and maintaining the box and carrier in an inclined position after passage over said inclined plate.

4. The process of fabricating tapered roofing and siding elements on an inclined wire screen having an open-bottom box in contact therewith and an inclined plate therebeneath, which comprises passing the box and screen in the inclined direction over an inclined plate, introducing an aqueous suspension of felt stock into the box during its passage over the plate, moving the box and screen out of contact with the plate, and maintaining them in an inclined position until substantially all the water in the suspension has passed through the screen.

5. The process of fabricating fibrous units of varying thickness on an inclined wire screen having open-bottom containers superimposed thereon and an inclined plate therebeneath, which comprises placing the screen and containers on the inclined plate, feeding an aqueous suspension of fibrous stock into the containers, removing the screen and containers from contact with the plate, and maintaining the screen and containers in an inclined position while the water is filtering through the screen.

6. The process of manufacturing tapered shingles, which comprises superimposing open-bottom boxes on an inclined wire screen, introducing an aqueous suspension of fibrous material into the boxes, allowing the water to pass through the screen and tapered fibrous elements to be formed thereon, drying the tapered fibrous elements, saturating the dried elements with liquid bitumen, coating the saturated elements, and surfacing the coated elements with mineral grit.

7. The process of forming tapered fibrous elements which comprises feeding a suspension of fibrous material in a liquid to a series of containers having inclined foraminous bases to cause the fibrous material to build up in said containers, removing the liquid from the fibrous material in the containers through the foraminous bases to form fibrous elements, and removing the fibrous elements from the containers.

8. Apparatus for forming tapered fibrous units comprising an inclined foraminous carrier, means for holding fluid fibrous stock in contact with said carrier, and means for feeding fluid fibrous stock onto the carrier.

9. Apparatus for forming tapered fibrous units comprising an inclined foraminous support, a containing means in contact with the foraminous support and means for introducing a liquid suspension of fibrous material into the containing means.

10. Apparatus for forming tapered roofing and siding elements comprising an inclined foraminous supporting means, a container adapted to be contacted with said supporting means, means for opening and closing the bottom of said container, and means for introducing fluid stock into the container.

11. Apparatus for forming tapered felt shingles comprising an inclined wire screen, an open-bottom box the walls of which are adapted to contact with the upper surface of said wire screen, a plate in contact with the under surface of the screen, means for introducing an aqueous suspension of felt stock into the box, and means for removing the box and screen from contact with the plate.

12. In an apparatus for fabricating tapered fibrous elements, an inclined foraminous carrier, a series of open-bottom containers adapted to contact with the carrier, and means for introducing fluid fibrous material into the containers.

13. In an apparatus for fabricating tapered fibrous elements, a movable foraminous member, an inclined plate disposed to contact with said member, a series of open-bottom containers adapted to contact with the foraminous member during its passage over the plate, and means for introducing an aqueous suspension of fibrous material into the containers during their passage over the plate.

14. In an apparatus for forming felt units of varying thickness suitable for use in shingle manufacture, rollers spaced horizontally from each other in different horizontal planes, a foraminous member adapted to move about said rollers, a stationary inclined plate disposed between said rollers and adapted to abut against the inner surface of said foraminous member during its passage thereover, a series of open-bottom stock boxes adapted to contact with the outer surface of and travel at substantially the same speed as the foraminous member, and means for introducing an aqueous suspension of felt stock into the stock boxes during their passage over the inclined plate.

15. Apparatus for making fibrous elements which comprises a series of containers having inclined foraminous bases, means for supplying a liquid suspension of fibrous material to said containers, means preventing flow of liquid from the container during the supply of suspension to the container, means for removing liquid from the containers to form fibrous elements therein, and means for removing the fibrous elements from the containers.

16. In an apparatus for forming felt units suitable for use in shingle manufacture, spaced rollers, a foraminous member adapted to move about said rollers, a stationary plate disposed between said rollers and adapted to abut against the inner surface of said foraminous member during its passage thereover, a series of open-bottom stock boxes adapted to contact with the outer surface of and travel at substantially the same speed as the foraminous member, and means for introducing an aqueous suspension of felt stock into the stock boxes during their passage over the plate.

17. Apparatus for forming tapered fibrous units comprising in combination an inclined screen, an open bottom container in contact with said screen, and means for feeding fibrous stock to said container.

18. Apparatus for forming felt shingles comprising a screen, an open-bottom box adapted to contact with the screen, a plate in contact with the screen to prevent flow therethrough, means for introducing an aqueous suspension of felt stock into the box, and means for removing the box and screen from contact with the plate.

19. The process of fabricating tapered fibrous units which comprises supplying a liquid suspension of fibrous material to an inclined foraminous member, filtering the liquid from said suspension thru said foraminous member to deposit the fibers in said suspension as a tapered fibrous mass on said member.

20. The process of fabricating fibrous units of varying thickness on an inclined foraminous support which comprises supplying fibrous stock in liquid suspension to the support, restricting the horizontal flow of said suspension introduced onto said support within limits which define the length and width of the fibrous units, draining the liquid from said suspension thru the support to deposit the fibers as a fibrous mass having its lower surface in contact with said support, the upper surface of said suspension assuming a substantially horizontal position under the influence of gravity whereby the fibrous unit resulting from the draining away of the liquid is of tapered contour.

21. The process of forming tapered fibrous shingle elements on an inclined foraminous support which comprises introducing a liquid suspension of fibrous material onto said support, restricting horizontal flow of said suspension introduced onto said support within limits which define the length and width of the desired elements, and filtering the liquid thru said support whereby the fibers of said suspension are deposited on said support as tapered, fibrous masses.

FLOYD W. ADAMS.